United States Patent
Ogimoto

(10) Patent No.: US 6,208,789 B1
(45) Date of Patent: Mar. 27, 2001

(54) PROBE, METHOD OF ITS MANUFACTURING, AND PROBE-TYPE MEMORY

(75) Inventor: Yasushi Ogimoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/463,184
(22) PCT Filed: Jul. 15, 1998
(86) PCT No.: PCT/JP98/03171
  § 371 Date: Jan. 21, 2000
  § 102(e) Date: Jan. 21, 2000
(87) PCT Pub. No.: WO99/05530
  PCT Pub. Date: Feb. 4, 1999

(30) Foreign Application Priority Data

Jul. 22, 1997 (JP) .................................... 9-195903

(51) Int. Cl.[7] .................................................. G02B 6/02
(52) U.S. Cl. ...................................... 385/123; 385/117
(58) Field of Search ................................. 385/123, 117, 385/118, 124, 31, 39; 356/445, 448

(56) References Cited

U.S. PATENT DOCUMENTS 5,960,147 * 9/1999 Muramatsu et al. ................ 385/123

FOREIGN PATENT DOCUMENTS 8-94648  4/1996  (JP) .
8-94649  4/1999  (JP) .
8-94939  4/1999  (JP) .

OTHER PUBLICATIONS

International Preliminary Examination Report PCT/JP98/03171 filed Jul. 15, 1998.

* cited by examiner

Primary Examiner—Phan T. H. Palmer
(74) Attorney, Agent, or Firm—Morrison & Foerster

(57) ABSTRACT

A probe comprising a core (2) having a first end part (2a) on which light from a light source is incident and a second end part (2b) with a diameter smaller than a wavelength of the incident light and a cladding (1) covering the core (2). A thin nitride film (3) made of at least one nitride selected from titanium nitride, zirconium nitride, and hafnium nitride is formed on a surface of the core (2) on the side of the second end part (2b) except the first and second end parts (2a) and (2b). The thin nitride film (3) has a high reflectivity for light with a wavelength of longer than 600 nm and the incident light does not leak out of the probe and reaches the tip of the probe, so that the intensity of the light emitted from the tip of the probe is improved. When the probe is used in a probe-type memory, high density recording with an excellent signal quality (S/N) can be realized.

9 Claims, 4 Drawing Sheets

PROBE, METHOD OF ITS MANUFACTURING, AND PROBE-TYPE MEMORY

TECHNICAL FIELD

The present invention relates to a scanning-near-field-microscope, a probe utilizing near-field-optics, a method of manufacturing it, and a probe-type memory.

BACKGROUND ART

In recent years, utilizing a SNOM (Scanning-Near-Field-Optical-Microscope) realizing formation of an ultra resolving power image exceeding the limitation of an optical wavelength, researches are made to develop a high-density memory (SNOM-type memory) of 60 Gbit/in$^2$–1 Tbit/in$^2$ passing the limitation of the conventional optical or magnetic recording performance.

To achieve the generation of the ultra resolving power image by near-field-optics, it is necessary to utilize an electromagnetic field called an evanescent field. In the SNOM-type memory, as a method of generating and detecting the evanescent field, an optical fiber probe and a hollow probe made of a dielectric substance are usually used. These probes have an end part at its tip having a length shorter than the wavelength of light that is incident thereon. The light leaves the probe from the end part as the evanescent field. It is known that the resolving power of the probe is almost equal to the length of the end part. The ultra resolving power image can be obtained by utilizing such a probe.

Accordingly, as the probe for use in the SNOM-type memory intended to obtain high-density recording, it is necessary to optically form an aperture so designed that the aperture has a diameter almost equal to a required resolving power. The intensity of the light leaving the tip of the probe is another factor determining a signal quality (S/N) and recording density. Thus, in the probe for use in the high-density memory, it is important to allow the incident light to reach the tip of the probe without the incident light leaking out from the probe.

Research has been hitherto made to prevent light from leaking out from the probe by forming a thin metal film on the outer surface of the probe. The use of a semiconductor laser is most favorable as the light source of the high-density memory. The wavelength of the semiconductor laser is 635 nm, 650 nm, 780 nm, and 830 nm which are more than 600 nm. Therefore, as the thin metal film covering the probe, a material having a high reflectivity for light with a wavelength more than 600 nm is desired. As the thin metal film having a high reflectivity for the light with the wavelength more than 600 nm, gold (Au) and copper (Cu) are described in Japanese Patent Application Laid-Open Publication No.8-94649. It is a well-known fact that Au and Cu indicate a high reflectivity for the light with the wavelength more than 600 nm as described in "New Edition of Table of Physical constants, table 7.1.2.3. P.172" or the like.

However, in an experiment in which the Au film having a high reflectivity is formed and light emitted by an He—Ne laser (632.8 nm) was incident on one end of the probe, the incident light was unable to reach the tip of the probe without the incident light leaking out from the probe. Thus, the intensity of the light at the tip of the probe is remarkably reduced, and the signal quality (S/N) is inferior. Accordingly, the experiment has revealed a problem that the probe is incapable of accomplishing high-density recording.

DISCLOSURE OF INVENTION

As a means for solving the problem, it has been found by the present invention that a probe that will be described below is effective.

It is an object of the present invention to provide a probe comprising a core having a first end part on which light from a light source is incident and a second end part with a diameter smaller than a wavelength of the incident light and a cladding covering the core, wherein a light-intercepting part having a thin nitride film made of at least one nitride selected from titanium nitride, zirconium nitride, and hafnium nitride is formed on a surface of the core at least at the second end part side except the first and second end parts.

The probe shows a high reflectivity for light with a wavelength of longer than 600 nm and prevents light from leaking out therefrom. Accordingly, it is possible to provide the probe that reduces the intensity of the light at the tip thereof in a small degree.

Further, it is an object of the present invention to provide a probe comprising a cylindrical body having a first aperture part on which light from a light source is incident and a second aperture part with a diameter smaller than a wavelength of the incident light, wherein a light-intercepting part having a thin nitride film made of at least one nitride selected from titanium nitride, zirconium nitride, and hafnium nitride is formed on a peripheral surface of the cylindrical body at least at the second aperture part side except the first and second aperture parts.

The probe shows a high reflectivity for the light with the wavelength of longer than 600 nm and prevents the light from leaking out therefrom. Thus, it is possible to provide the probe that reduces the intensity of the light at the tip thereof in a small degree.

Further, according to one embodiment, in a probe a thickness of the thin nitride film is 10 nm or more and 1000 nm or less.

That is, the film of titanium nitride, zirconium nitride, and hafnium nitride indicate a high reflectivity respectively for light with the wavelength of longer than 600 nm and can cover the probe uniformly in the thickness of 10 nm or more. Further, because they have excellent adhesive property, it is possible to cover the probe up to a thickness of 1000 nm without film peel. Moreover, it is preferable to set the thickness of the film of the titanium nitride, the zirconium nitride, and the hafnium nitride to 1000 nm or less to securely obtain a clearance for preventing a recording medium and the probe from colliding with each other.

Further, according to one embodiment, in a probe the light-intercepting part has a thin metal film made of one metal selected from titanium, zirconium and hafnium in contact with the core and the thin nitride film formed on the thin metal film and made of a nitride of the thin metal film.

By forming a two-layer construction having a thin nitride film and a thin metal film selected from at least one of titanium nitride/titanium, zirconium nitride/zirconium and hafnium nitride/hafnium, the stress of the thin nitride film can be relaxed and the adhesive property thereof can be improved. Thus, even when the intensity of incident light is increased, the probe has no film peel and a low degree of reduction in the intensity of the incident light at the tip thereof.

Further, according to one embodiment, in a probe a thickness of the thin nitride film is 10 nm or more and 1000 nm or less; and a thickness of the thin metal film is 10 nm or less.

In the probe, the film of the titanium nitride, the zirconium nitride, and the hafnium nitride indicate a high reflectivity respectively for light with the wavelength of longer than 600 nm and can cover the probe uniformly in the thickness of 10 nm or more. Further, because they have excellent adhesive property, it is possible to cover the probe up to a thickness of 1000 nm without film peel. Moreover, it is preferable to set the thickness thereof to 1000 nm or less to securely obtain a clearance for preventing a recording medium and the probe from colliding with each other. When the thickness of the thin metal film is 10 nm or less, the reflectivity of the light-intercepting part is hardly affected by the thin metal film and the adhesive property of the thin nitride film can be improved.

In a method of manufacturing a probe, according to the present invention, including a light-intercepting part having the thin metal film and the thin nitride film, the thin metal film and the thin nitride film are successively formed without exposing the surface of the metal film to an oxygen gas.

According to the method of manufacturing the probe, by successively forming a two-layer construction having a thin nitride film and a thin metal film selected from at least one of titanium nitride/titanium, zirconium nitride/zirconium and hafnium nitride/hafnium without exposing the surface of the metal film to an oxygen gas, the stress of the thin nitride film can be relaxed and the adhesive property thereof can be improved. Thus, even when the intensity of incident light is increased, the probe has no film peel and a low degree of reduction in the intensity of the incident light at its tip, with the thickness of the thin nitride film kept in the above-described range (10 nm or more and 1000 nm or less) and the thickness of the thin metal film kept in the range of 10 nm or less.

Further, the present invention provides a probe-type memory (apparatus for writing information to recording medium and/or reading information therefrom) in which recording of a small bit is recorded by using the probe.

Having such a probe, it is possible to provide a probe-type memory capable of performing high-density recording.

BEST MODE FOR CARRYING OUT THE INVENTION

A comparison example and embodiments of the present invention for showing the effectiveness of a probe using a thin nitride film, a method of manufacturing it, and a probe-type memory will be described below.

[Comparison Example]

As the comparison example, examples of two kinds of probes covered with an Au film and a Cu film are shown below. The Au film and the Cu film were formed on a glass substrate and the reflectivity of each thereof was measured with a He—Ne laser (632.8 nm). It was confirmed that the Au film and the Cu film had a high reflectivity of 92% and 89% respectively, as known from literatures.

The Au film and the Cu film showing the high reflectivity respectively were formed on the surface of an optical fiber except end parts thereof. Light emitted by the He—Ne laser (632.8 nm) of 5 mW was incident from one end part of the probe. Measuring the optical intensity of the light at the tip of the probe by approaching the probe to a photodetector, it was found that the optical intensity was remarkably reduced to about 6 pW.

To examine the cause of the reduction in the optical intensity, films were formed on the surface of the probe by changing the thickness thereof in the range of 10 nm–1000 nm to examine the surface of the probe with an SEM (scanning-type electron microscope). The result was that when the thickness of films was less than 30 nm, pin holes were formed thereon; and when films had a thickness of 100 nm–1000 nm, they had no pin holes formed thereon and peeled at a plurality of portions. Even in the case of a film not peeled immediately after it was formed, it also peeled when it was observed again with the SEM after it was used several times. As a cause of the peeling, the Au film and the Cu film have a low degree of adhesion to the probe. As another cause, the Au film and the Cu film have a high degree of thermal strain for the probe in their thermal history during the use of the probe.

As the main cause for the reduction of the optical intensity at the tip of the probe, it is regarded that the light in the probe leaks out from the pin holes and the peeled portions formed in the Au film or the Cu film. That is, although the Au film or the Cu film show a high reflectivity for the light with the wavelength more than 600 nm, they have a low degree of adhesion to the probe. Therefore, they have the pin holes formed thereon and peel and thus the light leaks out therefrom. Consequently, the intensity of the light at the tip of the probe is reduced. Thus, the probe has a problem in using it for a high-density memory.

(First Embodiment)

Figure 1:
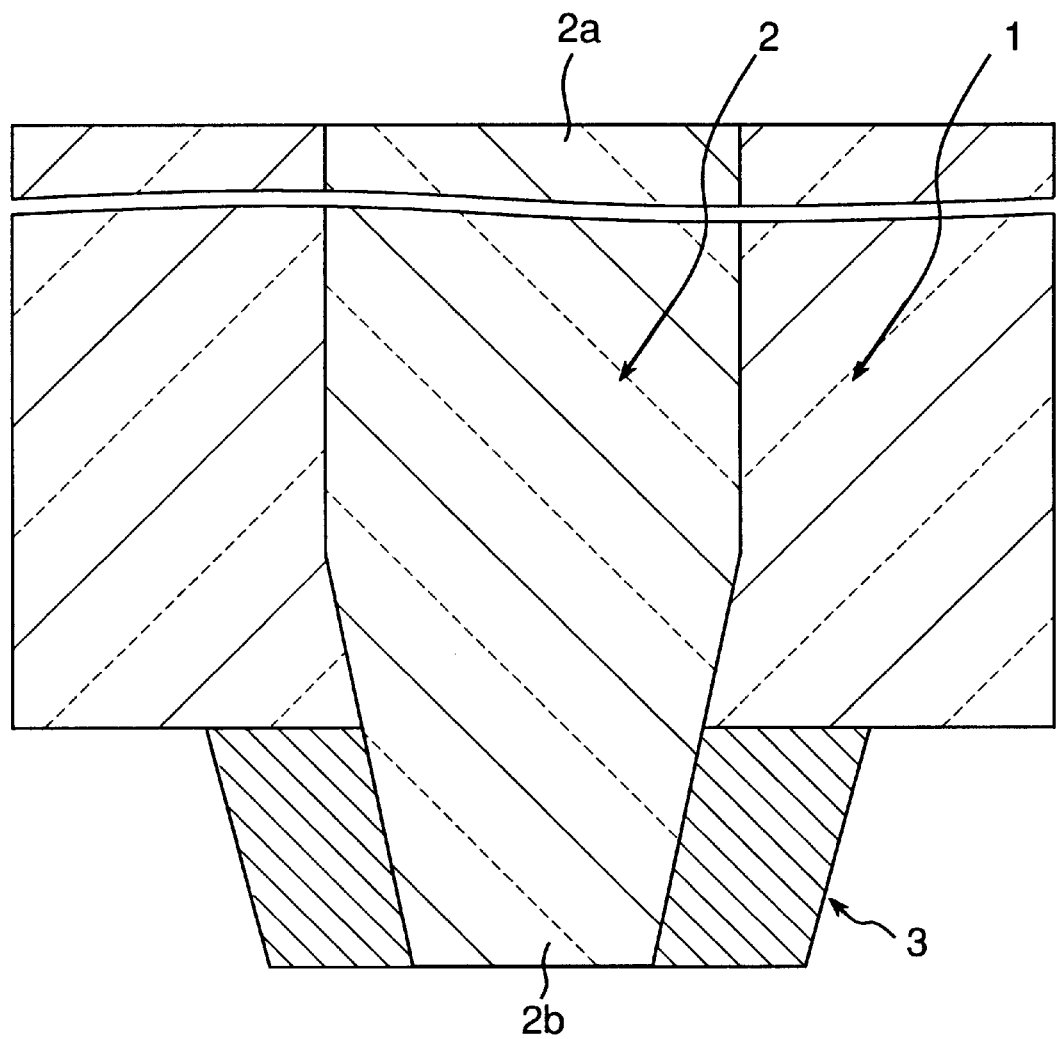
FIG. 1 is a schematic sectional view of a probe of a first embodiment of the present invention.

FIG. 1 is a schematic sectional view of a probe of a first embodiment. Used as a base material of the probe was an optical fiber including a core 2 having a first end part 2a on which light emitted from a light source is incident and a second end part 2a with a diameter smaller than the wavelength of the incident light and a cladding 1 covering the core 2. The outer diameter of the optical fiber and the diameter of the core 2 were 140 μm and 8 μm, respectively. The tip at one side of the optical fiber was so etched that the tip had a diameter of about 100 nm.

A TiN (titanium nitride) film 3 which is a light-intercepting part was formed on an outer surface of the etched tip of the optical fiber by reactive RF magnetron sputtering method (FIG. 1). As the TiN film-forming procedure, using a Ti metal (purity: 4N) as a target, after evacuation was made at a base pressure of $2 \times 10^{-4}$ Pa, the probe was heated. Thereafter, sputtering gas was introduced into a film-forming chamber to adjust the pressure thereof to a pressure suitable for sputtering. As the sputtering gas, an Ar gas and a $N_2$ gas were used. Depending on a case, sputter-etching is performed by using the Ar gas and the $N_2$ gas immediately before the formation of the film.

Initially, the forming condition of the TiN film 3 was investigated. The film was formed in the following condition in which an RF power, the temperature of the substrate, and the pressure of the gas were fixed to 100 w, 200° C., and 0.6 Pa respectively, and the ratio of the Ar gas to the $N_2$ gas was changed to 8/2, 7/3, 6/4, 5/5, 4/6, 2/8. The thickness of the film was set to 200 nm by controlling a film-forming time period.

In the condition that the $N_2$ gas was less than the amount which gives $Ar/N_2=7/3$, a film having a metallic silver color was obtained, whereas in the condition that the $N_2$ gas was more than the amount which gives $Ar/N_2=7/3$, a film having a color similar to reddish copper was obtained. When the Ar/N$_2$ was less than 7/3, the film-forming speed of the film was rapidly reduced to about ¼ of that of the Ti film. When the N$_2$ gas was more than the amount that gives Ar/N$_2$=7/3, the film-forming speed was almost constant. From the change in the color of the film and in the film-forming speed, it was decided that in the condition that the N$_2$ gas was more than the amount which gives Ar/N$_2$=7/3, the TiN film was formed. The film-forming speed is reduced owing to an apparent reduction of sputtering percentage caused by the formation of the nitride on the target.

Because it is difficult to measure the reflectivity of the TiN film formed on the probe, a TiN film was formed on a glass substrate in the same condition (N$_2$ gas was more than the amount which gives Ar/N$_2$=7/3). The reflectivity of the TiN film was measured with the He—Ne laser (632.8 nm), and an XRD (X-ray diffraction) was conducted to examine the structure of the TiN film. The reflectivity of the TiN film was about 80% which was lower than that of an Au film which was 90% or more measured in the same condition. As a result of the XRD measurement, it was found that the TiN film was amorphous. In the case where the amount of the N$_2$ gas was increased, the color and reflectivity of the TiN film did not make a great change. This is regarded that although the N$_2$ gas was incorporated into the TiN film, the amount of the N$_2$ gas which contributed to the formation of the TiN film is small because the TiN film was amorphous.

Investigating the film-forming condition further to improve the reflectivity of the TiN film, it was found that when a gas pressure was less than 0.26 Pa (2 mTorr), a film showing a gold color was obtained. It was also found that in the case where a film was formed at the same gas ratio Ar/N$_2$, the film-forming speed was high when the gas pressure is low. In other words, supposing that the film-forming speed is constant, it is preferable that the gas pressure is low. Examining the reflectivity and crystallinity of the TiN film, it was found that the reflectivity was increased to about 90% and that the TiN film had the (111) orientation. It is regarded that because the N$_2$ gas was incorporated into the TIN film sufficiently crystallized, the amount of the N$_2$ gas which contributed to the formation of the TIN film increased, compared with the case where the TiN film was incorporated into the amorphous film.

The TiN film was formed on a probe by changing the thickness thereof in the range from 10 nm to 1000 nm in a condition (RF power: 100 w, temperature of substrate: 200° C., gas pressure: 0.26 Pa, and gas ratio Ar/N$_2$=7/3) which provides a high reflectivity. Examining the surface of the probe with the SEM, it was confirmed that no pin hole was formed on the TiN film having a thickness of 10 nm and that a flat film was formed uniformly without film peel occurring. This is because the adhesive property of the formed TiN film was excellent and covering property thereof was high.

Then, light emitted from the He—Ne laser (632.8 nm) of 5 mW serving as a light source was incident on the probe to measure the optical intensity thereof. The result was that the intensity of the light was 20 pW, at the tip of the probe, which was more than three times as high as that of the light that was incident on the probe of the comparison example.

A thin film of ZrN and HfN formed on a probe were crystallized and adhered to the probe in a high degree. It was confirmed that in the same range of film thickness, the nitride films indicated a high reflectivity respectively for light emitted from the He—Ne laser (632.8 nm) and that the intensity of the light at the tip of the probe was also sufficiently high. It was also found that owing to the improvement of the mechanical strength of the probe caused by the formation of the TiN film which covered the probe, the probe was hardly damaged unlike the probe on which the Au film is formed.

Regarding the thickness of the thin nitride film covering the probe, it is important to consider that the probe for a scanning-near-field-optical-microscope or a high-density memory approaches a sample or a recording medium as close as 10–20 nm. When the thickness of the thin nitride film covering the probe is large, the physical diameter of the tip of the probe is almost equal to (two-fold of film thickness+diameter of aperture), although the diameter of the tip depends on the diameter of the aperture at the tip of the probe and a tapered degree of the tip. If an angle dislocation occurs between the probe and the recording medium owing to vibrations or the like in approaching the probe having a large diameter at the tip thereof to a point 10–20 nm apart from the recording medium, it is difficult to secure the margin of a clearance that is provided between the probe and the recording medium to prevent collision thereof. For example, supposing that the surface of the recording medium is flat; the distance between the probe and the recording medium is set to 10 nm; and a film of 1000 nm is formed on the probe having an aperture diameter of 100 nm, the allowable angle dislocation $\theta$ in the worst case can be estimated from an equation shown below:

$$\theta=\text{arc tangent } \{10/(2\times1000+100)\}$$

The value of $\theta$ is as small as about 0.27 degree, which makes it difficult to secure the margin.

Needless to say, it is necessary that the thickness of the thin nitride film covering the probe is large enough to keep light inside the probe. However, when the thin nitride film is thicker than a required thickness, in addition to the problem of strain-caused film peel, there occurs the problem of clearance for preventing the recording medium and the probe from colliding with each other. Accordingly, it is preferable to set the thickness of the thin nitride film to 1000 nm or less in practical use.

As described above, the probe includes the core 2 having the first end part 2a on which light from the light source is incident and the second end part 2b with a diameter smaller than the wavelength of the incident light and the cladding 1 covering the core 2. The thin nitride film 3 made of at least one nitride selected from titanium nitride, zirconium nitride, and hafnium nitride is formed on the surface of the core 2 at the second end part 2b side except the first and second end parts 2a and 2b. Thus, the probe shows a high reflectivity for the light with the wavelength of longer than 600 nm and prevents the light incident from leaking out therefrom. Accordingly, it is possible to provide the probe that reduces the intensity of the light at the tip thereof in a small degree.

The film of the titanium nitride, the zirconium nitride, and the hafnium nitride indicate a high reflectivity respectively for the light with the wavelength of longer than 600 nm and can cover the probe uniformly in the thickness 10 nm or more. Further, because they have excellent adhesive property, it is possible to form a probe covered therewith up to a thickness of 1000 nm without film peel. Moreover, it is possible to securely obtain a clearance for preventing the recording medium and the probe from colliding with each other by setting the thickness of t he film of the titanium nitride, the zirconium nitride, and the hafnium nitride to 1000 nm or less.

Although in the first embodiment, the RF-magnetron sputtering method is used as the film-forming method, other physical film-forming methods such as DC-magnetron sputtering method, evaporation, and ion plating or chemical film-forming methods such as CVD may be used.

The optical fiber is used as the base material of the probe in the first embodiment. But in addition, a hollow probe may be used. For example, referring to FIG. 4, in a probe having a cylindrical body 31 made of glass or the like having a first opening part 33 on which light is incident and a second opening part 34 with a diameter smaller than the wavelength of the incident light, a thin nitride film 32 consisting of one nitride selected from at least one of the titanium nitride, the zirconium nitride, and the hafnium nitride may be formed on a peripheral surface of the cylindrical body 31 except the first and second opening parts 33 and 34.

[Second Embodiment]

Using the probe formed in the first embodiment for a long time by increasing the input power of the He—Ne laser (632.8 nm) to 40 mW, it was found that the intensity of light which left the probe was reduced to about 6 pW. Observing the surface of the probe with the SEM, it was found that the film covering the probe was cracked. The crack occurred for the following reason: Because light continued to be incident on the probe at a great power for a long time, the temperature at the tip of the probe covered with the film rose. Then, the probe was cooled. Heating and cooling of the probe were carried out repeatedly. As a result, there occurred a difference between the thermal expansion degree of the thin nitride film and that of the optical fiber that is the base material of the probe. To relax the thermal strain and prevent the generation of the crack, an experiment of forming a Ti film between the base material of the probe and the TiN film was conducted.

Figure 2:
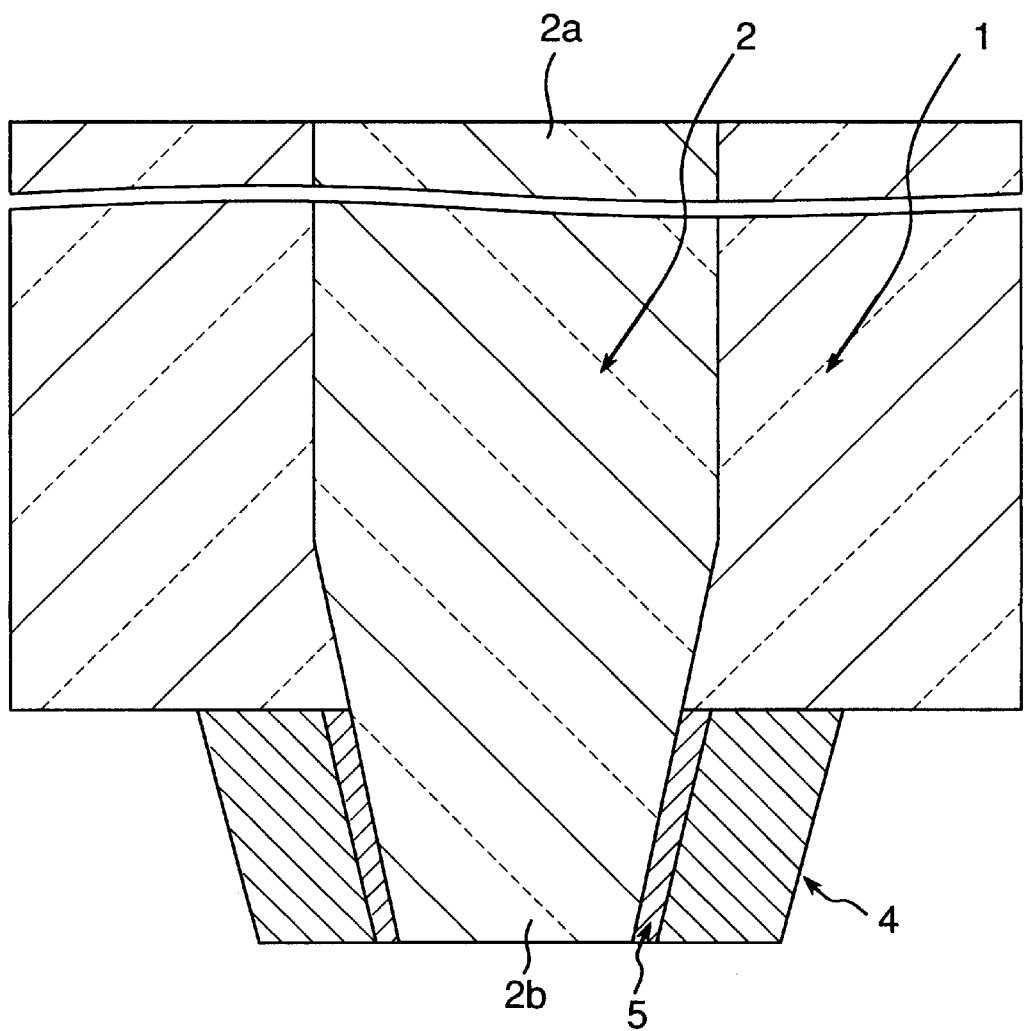
FIG. 2 is a schematic sectional view of a probe of a second embodiment of the present invention.

FIG. 2 is a schematic sectional view of a probe of a second embodiment of the present invention. Except a light-intercepting part, the probe of the second embodiment has a construction identical to that of the first embodiment. Thus, like parts are denoted by like reference numerals and description thereof are omitted herein.

Using a base material of the probe similar to that of the first embodiment and a film-forming condition similar thereto, a construction of TiN/Ti/probe was formed, with the thickness of a TiN film 4 set to 10 nm–1000 nm and that of a Ti film 5 set to 10 nm (TiN/Ti shows the construction of a light-intercepting part in which the TiN film is formed on the Ti film). The reflectivity of the Ti film 5 for incident light having the wavelength longer than 600 nm was not as high as that of the TiN film 5. But in the case where the thickness of the Ti film 5 was as thin as 10 nm, the reflectivity of the TiN/Ti was not substantially affected by the Ti film 5. It was also found that the interface of the TiN/Ti was not influenced by adsorption of oxygen or the like, because the TiN/Ti was successively formed without exposing the surface of the metal film to an oxygen gas and that the two-layer structure having a high degree of adhesive property was formed.

Similarly to the first embodiment, light emitted to the probe by the He—Ne laser (632.8 nm) was incident thereon by increasing the input power thereof to 40 mW to observe the surface thereof with the SEM. No crack was observed and it was confirmed that the intensity of the light that left the tip of the probe was as high as about 120 pW.

It was also confirmed that a ZrN/Zr film and a HfN/Hf film formed on a probe did not have crack which is caused by the difference between the thermal expansion of the probe and the films. To examine the reason, thermal conduction and thermal expansion of the films were examined. As a result, it was revealed that as one of factors, owing to the suppression of a temperature rise of the ZrN film caused by the fact that the ZrN film is superior to the TiN film and HfN film in heat conductivity, the ZrN film has a thermal expansion-caused strain in a smaller extent than the TiN film and the HfN film. In the case of the HfN film, it was found that although the HfN film is inferior to the ZrN film in its thermal conduction, the thermal expansion degree of the HfN film is low and close to that of glass. Thus, the difference in the degree of thermal expansion between the HfN/Hf film and the HfN film is small. Accordingly, the HfN film has a small degree of strain.

As described above, by successively forming the light-intercepting part having the two-layer construction of the thin nitride film and the thin metal film selected from at least one of the titanium nitride/titanium, the zirconium nitride/zirconium and the hafnium nitride/hafnium without exposing the surface of the metal film to an oxygen gas, the stress of the thin nitride film can be relaxed and the adhesive property thereof can be improved. Thus, even when the intensity of the incident light is increased, the probe has no film peel and a low degree of reduction in the intensity of the incident light at its tip, with the thickness of the thin nitride film kept in the above-described range (10 nm or more and 1000 nm or less) and the thickness of the thin metal film kept in the range of 10 nm or less.

Although the RF-magnetron sputtering method is used as the film-forming method in the second embodiment, other physical film-forming methods such as DC-magnetron sputtering method, evaporation, and ion plating or chemical film-forming methods such as CVD (chemical vapor deposition) may be used.

Figure 4:
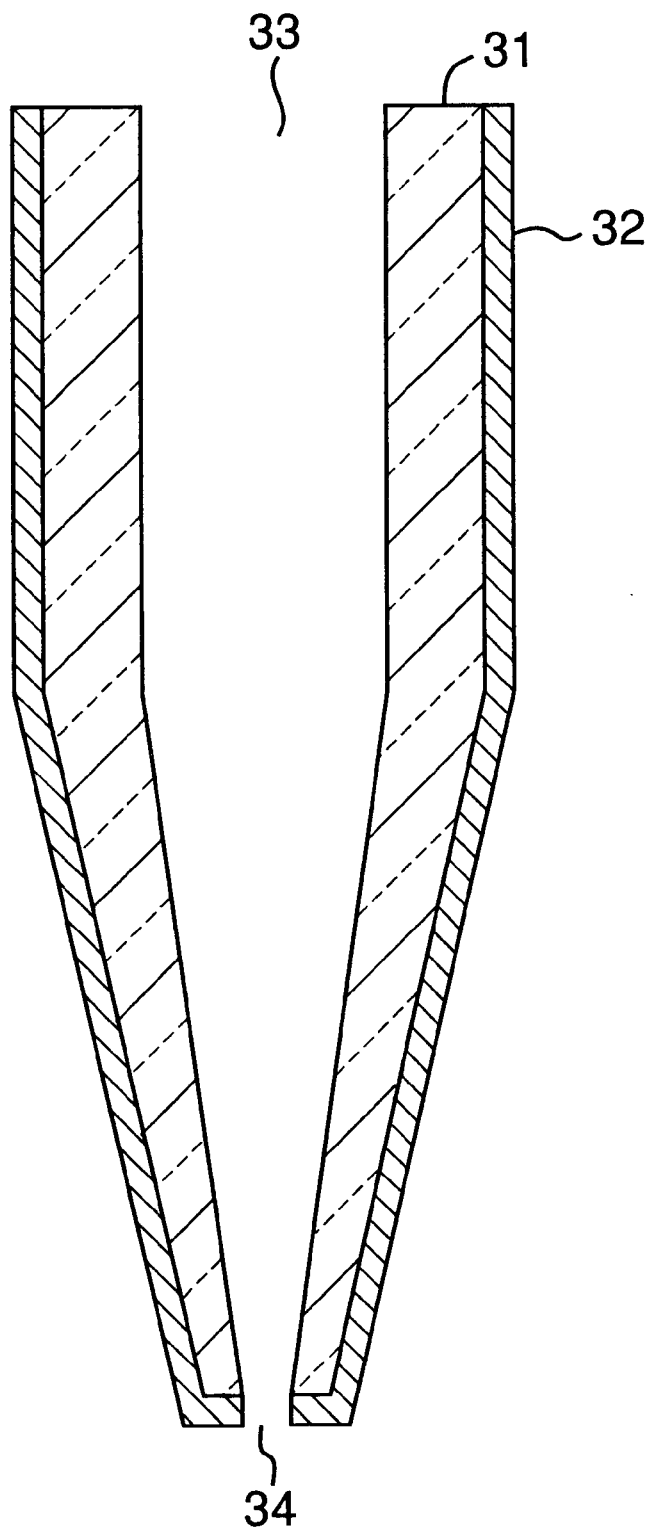
FIG. 4 is a schematic sectional view of a probe having a cylindrical body of the present invention.

Instead of the thin nitride film 32 of the hollow probe shown in FIG. 4, it is possible to form a two-layer construction having a thin nitride film and a thin metal film selected from at least one of the titanium nitride/titanium, the zirconium nitride/zirconium and the hafnium nitride/hafnium.

[Third Embodiment]

Figure 3:
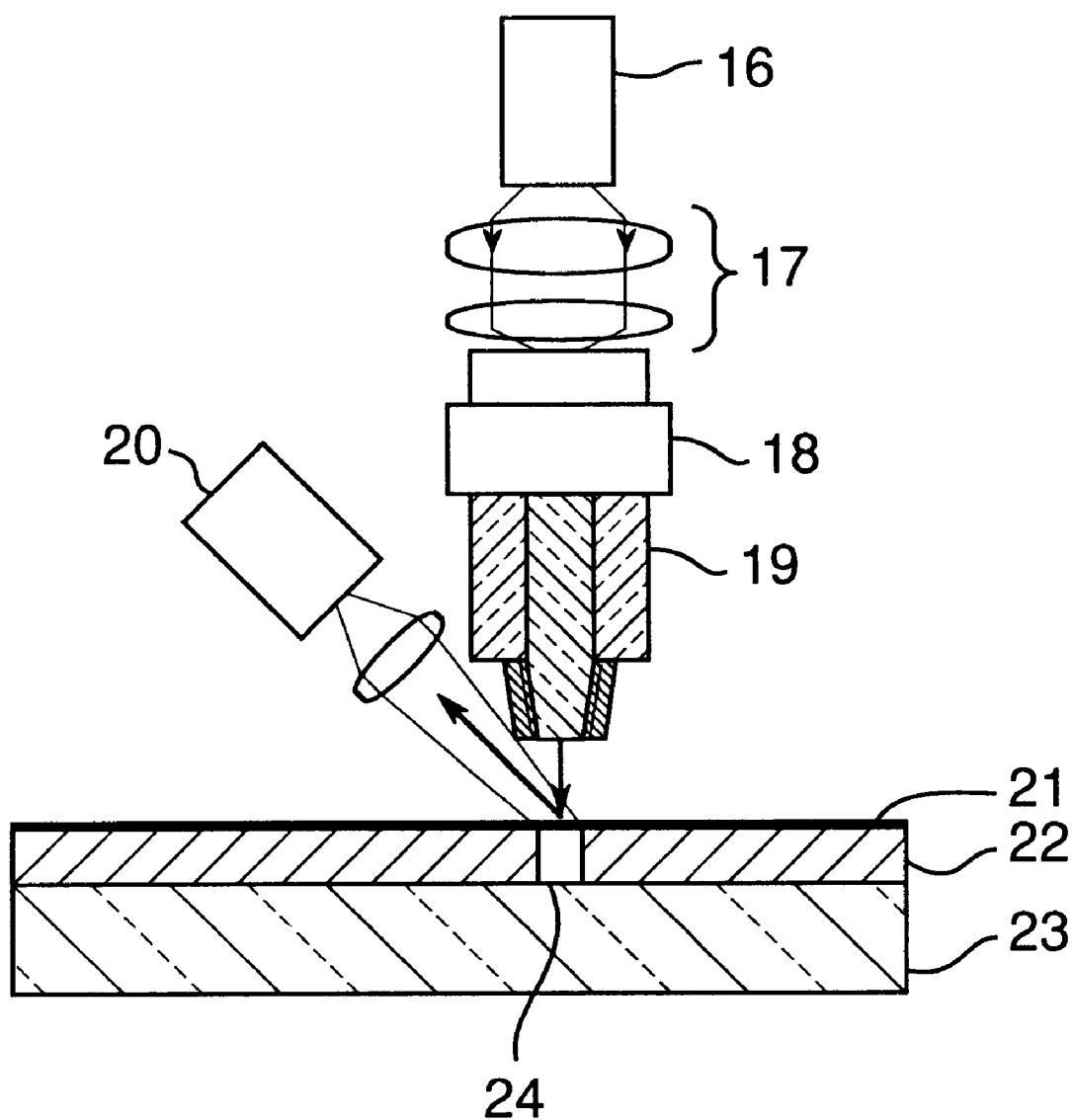
FIG. 3 is a schematic view of main parts of a probe-type memory apparatus having the probe of the first and second embodiments.

FIG. 3 is a schematic view of main parts of a probe-type memory including the probe of the second embodiment. Referring to FIG. 3, reference numeral 16 denotes a semiconductor laser, 17 denotes a probe-coupling lens system, 18 denotes a probe-coupling part, 19 denotes a probe, 20 denotes a photodetector, 21 denotes a protection film (carbon), 22 denotes a recording film (GeSbTe), 23 denotes a substrate (glass disk), and 24 denotes a recording bit.

In the probe-type memory, small bits are written to a recording medium by means of the probe formed in the first and second embodiments to examine the effectiveness of the probe for use in a high-density memory. Two kinds of probes were used by processing tips thereof such that the diameter thereof was 50 nm and 100 nm, respectively and forming a film of the titanium nitride/titanium in a thickness of 200 nm on each probe. As a light source, a semiconductor laser emitting light with a wavelength λ of 635 nm and an incident power of 20 mW was used. The light was incident on each probe, left the probe from its tip, and was reflected by the recording medium. The reflected light was detected by a photodetector. Bits were written to the recording medium by the probe while it was scanned in XY-direction, with the probe spaced at about 20 nm from the recording medium. To form the recording medium, a GeSbTe film was formed on a glass substrate as a phase-change recording film, and as a protection film, a C film having a thickness of 15 nm was formed on the GeSbTe film.

It was found that when the one probe whose tip had a diameter 100 nm was used, it was possible to form a bit having a diameter of about 100 nm almost equal to the diameter of the probe. It was also found that when the other probe whose tip had a diameter 50 nm was used, it was possible to form a bit having a diameter of about 50 nm almost equal to the diameter of the probe. This is for the following reason: Because there was no leakage of the light from the neighborhood of the tip of the probe, light left the probe in conformity to the diameter of the aperture of the tip and a bad influence such as increase of a bit size could be suppressed due to radiant heat by leakage of the light. According to the conventional art, when the intensity of the incident light increases, it leaks from the neighborhood of the tip of the probe and the bit size becomes large. Thus, decrease of the intensity of the incident light is the only means to form a small bit. In this case, because the intensity of the incident light is weak, merely an incomplete recording is performed on the recording medium, which causes deterioration of a signal quality. On the other hand, in the probe of the present invention, even though the incident light having an intensity high enough to perform recording on the recording medium is emitted from the probe, the problem of the increase of the bit size or the like does not occur and it is possible to accomplish recording at a high density and with a high signal quality. Supposing that the interval between adjacent bits is twice as large as the bit size, the probe can accomplish a high-density recording of 16 Gb/in$^2$, 64 Gb/in$^2$. Thus, apparently the probe is suitable for use in a high-density memory.

For practical use, the probe for use in the memory is required to have durability and mechanical strength for a thermal history equal to the number of its access times. A repeated optical input test was conducted at ten millions of times on the probe. The result was that the probe did not deteriorate in its durability and mechanical strength, and the tip thereof was not damaged in an XY-direction scanning.

That is, by using the probe of the second embodiment in the probe-type memory, it was found that it was possible to form small bits, allow light having an intensity high enough to perform recording necessary for realizing an excellent signal quality to be incident on the probe, and achieve manufacturing of a high-density probe-type memory having durability important in practical use. A similar effect can be obtained by using the probe of the first embodiment for the probe-type memory.

Although the phase-change recording film is used as the recording film of the recording medium in the third embodiment, it is possible to use an optical magnetic film or the like as the recording medium, provided that the recording medium is capable of performing optical recording and thermal recording. Although the C film is used as the protection film of the recording medium of the third embodiment, an SiO$_2$ film may be used. Although the photodetector is used in the third embodiment in order to simplify the construction of the apparatus, the probe of the third embodiment can be used to perform a signal detection.

The present invention provides the probe indicating a high reflectivity for the light with the wavelength of longer than 600 nm required for practical use of the high-density memory utilizing the near-field-optics; allowing incident light to reach the tip thereof without the incident light leaking out therefrom; and reducing the intensity of -the light at the tip thereof in a small degree; and a method of manufacturing it.

Further, the probe of the present invention is excellent in its mechanical strength and durability important in practical use; not damaged by the small difference between the thermal expansion degree of the probe and that of the film covering the probe even though light with a high intensity is used for the probe; capable of improving the intensity of the incident light; does not have a problem of such as the increase of a bit size; and capable of accomplishing recording at a high density and with a high signal quality. Therefore, by using the probe of the present invention, it is possible to provide the high-density probe-type memory. Further, the probe is formed of the inexpensive material, the manufacturing method is also inexpensive, and is industrially valuable.

INDUSTRIAL APPLICABILITY

The probe of the present invention is used for the high-density probe-type memory performing recording of small bits.

What is claimed is:

1. A probe comprising a core having a first end part on which light from a light source is incident and a second end part with a diameter smaller than a wavelength of said incident light and a cladding covering said core, wherein a light-intercepting part having a thin nitride film made of at least one nitride selected from titanium nitride, zirconium nitride, and hafnium nitride is formed on a surface of said core at least at said second end part side except said first and second end parts.

2. A probe comprising a cylindrical body having a first aperture part on which light from a light source is incident and a second aperture part with a diameter smaller than a wavelength of said incident light, wherein a light-intercepting part having a thin nitride film made of at least one nitride selected from titanium nitride, zirconium nitride, and hafnium nitride is formed on a peripheral surface of said cylindrical body at least at said second aperture part side except said first and second aperture parts.

3. A probe according to claim 1 or 2, wherein a thickness of said thin nitride film is 10 nm or more and 1000 nm or less.

4. A probe according to claim 1 or 2, wherein said light-intercepting part has a thin metal film made of one metal selected from titanium, zirconium and hafnium in contact with said core and said thin nitride film formed on said thin metal film and made of a nitride of said thin metal film.

5. A probe according to claim 4, wherein a thickness of said thin nitride film is 10 nm or more and 1000 nm or less; and a thickness of said thin metal film is 10 nm or less.

6. A method of manufacturing a probe according to claim 5, wherein said thin metal film and said thin nitride film are successively formed without exposing the surface of the metal film to an oxygen gas.

7. A probe-type memory performing recording of a small bit and having a probe according to claim 4.

8. A method of manufacturing a probe according to claim 4, wherein said thin metal film and said thin nitride film are successively formed without exposing the surface of the metal film to an oxygen gas.

9. A probe-type memory performing recording of a small bit and having a probe according to any one of claims 1 and 2.

* * * * *